Patented Feb. 23, 1937

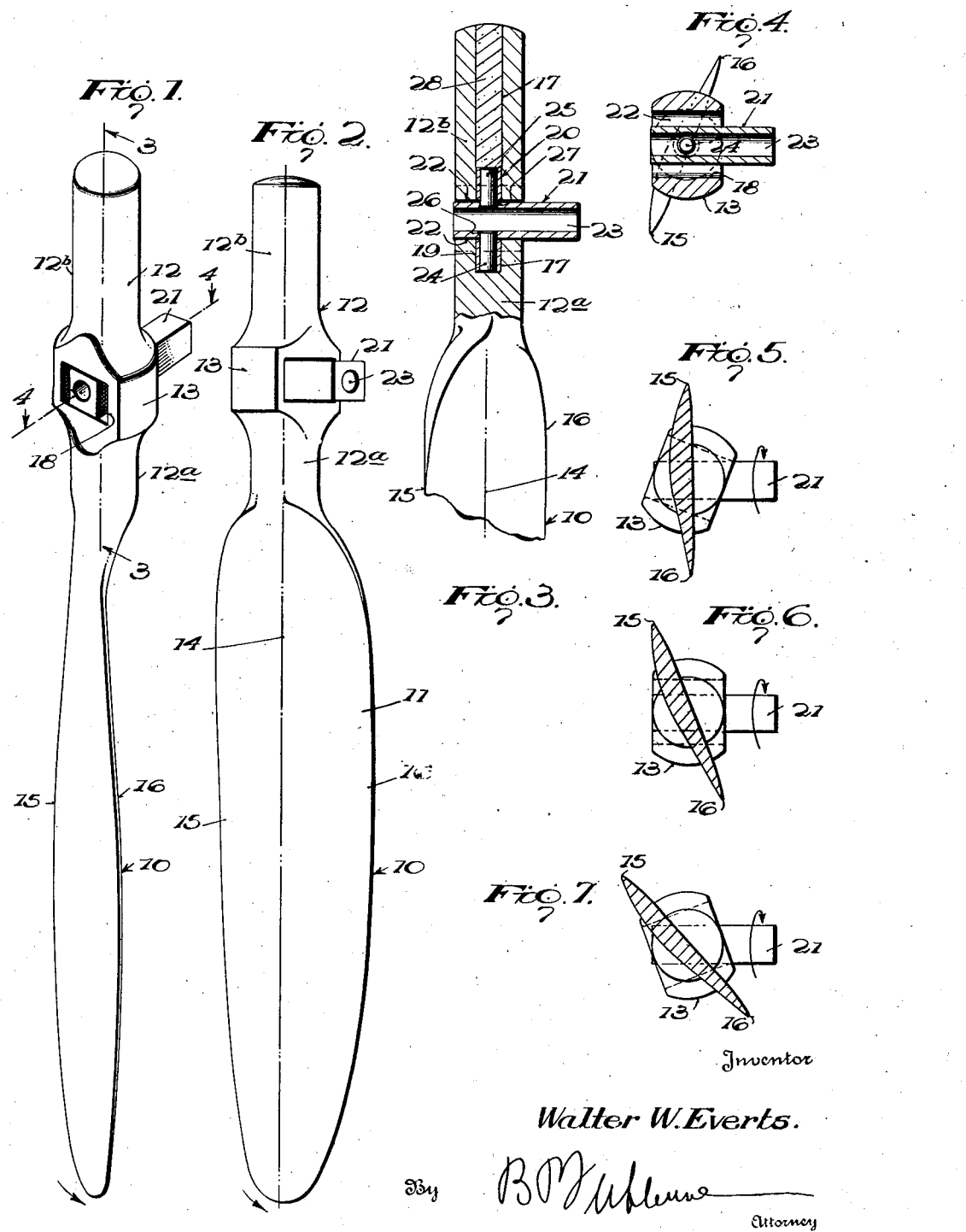

2,071,513

UNITED STATES PATENT OFFICE 2,071,513

PROPELLER FOR AIRCRAFT OR THE LIKE

Walter W. Everts, Baltimore, Md.

Application May 6, 1936, Serial No. 78,248

8 Claims. (Cl. 170—162)

My invention relates to propellers for aircrafts.

An important object of the invention is to provide a propeller of the above mentioned character, which is automatically actuated by centrifugal force, to vary the pitch of the propeller blade, as the atmospheric pressure varies.

A further object of the invention is to provide a propeller of the above mentioned character, which is balanced so that opposed portions are acted upon by centrifugal force, for eliminating friction and permitting of the free turning movement of the propeller blade for varying its pitch.

A further object of the invention is to provide simple and strong means for mounting the blade element upon the hub.

A further object of the invention is to provide a propeller of the above mentioned character embodying a single blade, whereby the propeller may be driven at an increased maximum speed with efficiency.

Other objects and advantages of the invention will be apparent during the course of the following description.

In the accompanying drawing forming a part of this application and in which like numerals are employed to designate like parts throughout the same, Figure 1 is a perspective view of a propeller embodying my invention, Figure 2 is a side elevation of the propeller blade, Figure 3 is a central vertical longitudinal section taken on line 3—3 of Figure 1, Figure 4 is a horizontal section taken on line 4—4 of Figure 1, Figure 5 is an end elevation of the blade end of the propeller showing the same at the sea level minimum pitch, Figure 6 is a similar view showing the blade at the maximum driving pitch, and, Figure 7 is a similar view showing the blade turned beyond the maximum driving pitch, when the thrust of the atmosphere exceeds the pulling force of the blade.

In the drawing, wherein for the purpose of illustration is shown a preferred embodiment of my invention, the numeral 10 designates a propeller as a whole, which is preferably formed of metal, such as aluminum or aluminum alloys. The propeller comprises a blade 11, preferably formed integral with a cylindrical shank 12. This cylindrical shank has an intermediate portion 13, which is radially enlarged in the direction of the plane of rotation of the propeller. The numeral 14 designates a line passing through the central longitudinal axis of the cylindrical shank 12 and longitudinally of the propeller blade, dividing the propeller blade into a leading portion or surface 15 and a trailing portion or surface 16. When the propeller blade is turned to adjust its pitch, the blade and shank 12 turn upon the line or axis 14. The trailing portion or area 16 is greater than the leading portion or area 15.

The shank 12 is provided with a central longitudinal cylindrical opening or bore 17, which extends through or intersects with a rectangular recess 18, formed in the enlarged intermediate portion 13. A bushing 19 is driven through the opening 17 and a second bushing 20 is driven through the opening 17 until it assumes a position adjacent to the opposite side of the recess 18.

The numeral 21 designates a hub or rotary element, which is preferably square in cross-section and having substantially a sliding fit with the opposed walls 22 of the enlarged portion 13. This hub or rotary element has an opening 23 for receiving the crank shaft of the engine, which will be rigidly secured therein by any suitable means. The shank 12 is pivoted upon the hub or rotary element 21 to turn thereon about its longitudinal axis or upon the line 14, by pins 24 and 25, which are inserted through the opening or bore 17 and rotatably inserted into the bushings 19 and 20 and driven into openings 26 and 27, formed in the hub or rotary element 21 and hence have rigid connection therewith. The pins 24 and 25 are in the center line 14. The shank 12 has parts 12a and 12b, arranged upon opposite sides of the hub or rotary element 21 and the enlarged intermediate portion 13. When the propeller blade 11 turns upon its longitudinal axis 14, both shank parts 12b and 12a turn in the same direction with the propeller blade. The shank part 12b upon one side of the hub or rotary element and the propeller blade with its shank 12a upon the opposite side of the hub or rotary element are balanced for smooth rotation, and also with respect to mass as acted upon by centrifugal force which tends to move them radially in opposite directions. The radial thrust of the shank part 12b is equal to the radial thrust of the blade 11 and its shank part 12a. This balancing of radial thrust in opposite directions, due to centrifugal force, eliminates excessive friction between the intermediate portion 13 and the hub or rotary element 21. The outer end portion of the opening or bore 17 may be filled with Babbitt metal 28 or any other suitable metal, and this filling serves to properly balance the parts, as explained. Any other suitable means may be employed to increase the weight of the shank part 12b, to balance the propeller, as is obvious. The radial axis of the centrifugally operated portion 13 is inclined or disposed at an acute angle with respect to the working face of the blade.

When the propeller is rotating at sea level, in the direction of the arrows, where the pressure of the atmosphere is at the maximum, the propeller has the minimum pitch, regardless of variations of speed. This is due to the fact that the trailing area 16 of the propeller is greater than the leading area 15, producing an unbalanced surface, whereby the resistance of the air will turn the propeller upon its longitudinal turning axis 14 in a direction to reduce the pitch of the blade. The position of the blade 11 at this minimum pitch is shown in Figure 5, and also the position of the enlarged intermediate portion 13, the end walls of the recess 18, now engaging the side walls of the hub or rotary element 21, thus limiting the minimum pitch of the blade. The centrifugally operated portion 13 is so balanced with respect to the unbalanced surfaces of the blade that the action of the centrifugally operated portion will be overcome by the resistance of the air upon the blade, with the propeller rotating at sea level, so that the centrifugally operated portion will not turn the propeller upon its longitudinal turning axis to increase the pitch of the blade, at the sea level elevation. As the rotating propeller rises to a higher altitude, the resistance of the air upon the unbalanced areas of the blade decreases and the action of centrifugal force upon the radially enlarged intermediate portion 13 is now sufficient to cause this enlarged portion to turn upon the pins 24 and 25 in a direction to increase the pitch of the propeller. Figure 6 shows the intermediate radially enlarged portion 13 at the true radial position at which the blade 11 will have the maximum propelling pitch. When the resistance of the air exceeds the driving action of the propeller, as when making a power dive, the pressure upon the trailing area 16, which is greater than the leading area 15, will tend to overcome the action of centrifugal force upon the radially enlarged portion 13 and will urge this radially enlarged portion 13 to the extreme position, as shown in Figure 7, which is limited by contact with the end walls of the recess 17, with the hub or rotary element 21, and thereby further increases the pitch of the propeller blade beyond the maximum propelling pitch.

Particular attention is called to the fact that the radially enlarged intermediate portion 13 is that portion of the propeller which is acted upon by centrifugal force to automatically vary the pitch of the propeller blade. All portions of the propeller blade element may be formed integral and no separate governor or operating parts are employed. The blade element is balanced both for smooth rotation and radial thrust due to centrifugal action. The blade element is securely attached to the hub or rotary element, and excessive weight is avoided.

A further advantage of my propeller is that by having only a single blade, the propeller may be driven at an increased maximum speed, with efficiency. As is well known, when a two or three blade propeller is driven beyond about 1700 to 1900 R. P. M., the efficiency of the propeller is reduced, due to the fact that one blade moves into the space or hole in the air produced by the leading blade. By having only one blade, properly balanced, this disadvantage is overcome, and my one blade propeller may be driven at a speed considerably above the normal efficiency speed of a two or three blade propeller, with efficiency, thus allowing engines to be driven at their maximum efficiency speed.

It is to be understood that the form of my invention herewith shown and described is to be taken as a preferred example of the same and that various changes in the shape, size and arrangement of parts may be resorted to without departing from the spirit of my invention or the scope of the subjoined claims.

Having thus described my invention, I claim:

1. In a propeller for aircrafts, a rotary element, and a blade element including a blade arranged generally radially with relation to the rotary element and having a fixed pivot upon the rotary element to turn upon its longitudinal axis about the fixed pivot said blade having a trailing area which is larger than its leading area so that the resistance of the air upon the rotating blade will turn the blade upon its longitudinal turning axis to reduce its pitch, said blade element having a portion to be acted upon by centrifugal force for increasing the pitch of the blade only when the atmospheric pressure is reduced, said blade element also having parts arranged upon opposite sides of the rotary element, the last named parts being acted upon by centrifugal force to produce radial thrusts in opposite directions which neutralize each other.

2. In a propeller for aircrafts or the like, a rotary element, and a blade element carried by the rotary element and including a single blade extending upon one side of the rotary element and a part extending upon the opposite side of the rotary element to balance the blade, a fixed pivot carried by the rotary element and connecting the single blade with the rotary element so that the single blade may turn about its longitudinal axis with relation to the rotary element, the blade having unbalanced trailing and leading areas so that the resistance of the air upon the blade will turn it upon its longitudinal turning axis to decrease the pitch of the blade, and a centrifugally operated portion rigidly attached to the blade and adapted to turn the blade upon its longitudinal turning axis only when the pressure of the air is reduced.

3. In a propeller for aircrafts or the like, a rotary element, a blade element comprising a shank and a blade carried by the shank, said blade having a trailing area which is larger than its leading area so that the resistance of the air upon the rotating blade will tend to turn the blade upon its longitudinal axis to reduce its pitch, said shank having an intermediate centrifugally operated portion, said portion having a recess to receive the rotary element, and a pivot fixed upon the rotary element and engaging the intermediate centrifugally operated portion so that the blade element may turn upon its longitudinal axis with relation to the rotary element, the arrangement of the centrifugally operated portion and blade being such that the centrifugally operated portion is swung outwardly by centrifugal force only when the atmospheric pressure is reduced to increase the pitch of the blade.

4. A propeller for aircrafts, comprising a rotary element, a single blade element arranged radially of the rotary element and including a shank and blade, said shank having a centrifugally operated portion, said portion having a recess to receive the rotary element, means fixed upon the rotary element and pivotally connecting the shank with the rotary element so that the shank and blade turn upon a longitudinal axis which remains fixed with respect to the rotary element, the area of the blade upon the trailing side of its longitudinal turning axis being greater than the area of the blade upon the leading side of such longitudinal turning axis so that the surfaces are unbalanced to cause the blade to be acted upon by air resistance and turned upon its longitudinal turning axis to decrease the pitch of the blade, the parts of the shank and blade upon opposite sides of the rotary element having such masses that they are acted upon by centrifugal force to produce radial thrusts in opposite directions which are balanced, the centrifugally operated portion being so made with respect to the unbalanced surfaces of the blade that it will automatically turn the blade upon its longitudinal turning axis to increase the pitch of the blade when the atmospheric pressure is reduced and will maintain the blade against turning movement upon its longitudinal turning axis when the air pressure remains the same and the blade element is driven at varying speeds.

5. A propeller for aircrafts, comprising a rotary element, a blade having a working face, pivot means connecting the blade with the rotary element and being in line with the center line of the blade, and a centrifugally operated portion carried by the blade, the axis of the centrifugally operated portion being disposed at an acute angle with respect to the working face of the blade so that the pitch of the blade is increased when the centrifugally operated portion moves outwardly due to the action of centrifugal force.

6. A propeller for aircrafts, comprising a rotary element, a blade having a working face, a pivot element carried by the rotary element and radially fixed with relation to the rotary element and serving to connect the blade with the rotary element, the pivot element being in line with the longitudinal turning axis of the blade, and a centrifugally operated portion secured to the blade and arranged at such an angle with respect to the working face of the blade that the pitch of the blade is increased when the centrifugally operated portion moves outwardly due to the action of centrifugal force.

7. In a propeller for aircrafts, a rotary element, a single blade, and pivot means connecting the blade with the rotary element, the pivot means being in line with the center line of the blade.

8. A propeller for aircrafts comprising a rotary element, a blade having a longitudinal center line and unbalanced surfaces upon opposite sides of the center line, pivot means connecting the blade with the rotary element and being in line with the center line of the blade, a centrifugally operated portion carried by the blade and having its radial axis inclined with respect to the unbalanced surfaces so that the pitch of the blade is increased when the centrifugally operated portion moves outwardly due to the action of the centrifugal force.

WALTER W. EVERTS.